March 10, 1942. J. NEUFELD 2,275,456
METHOD AND APPARATUS FOR RADIOACTIVE INVESTIGATION OF DRILL HOLES
Filed June 7, 1939
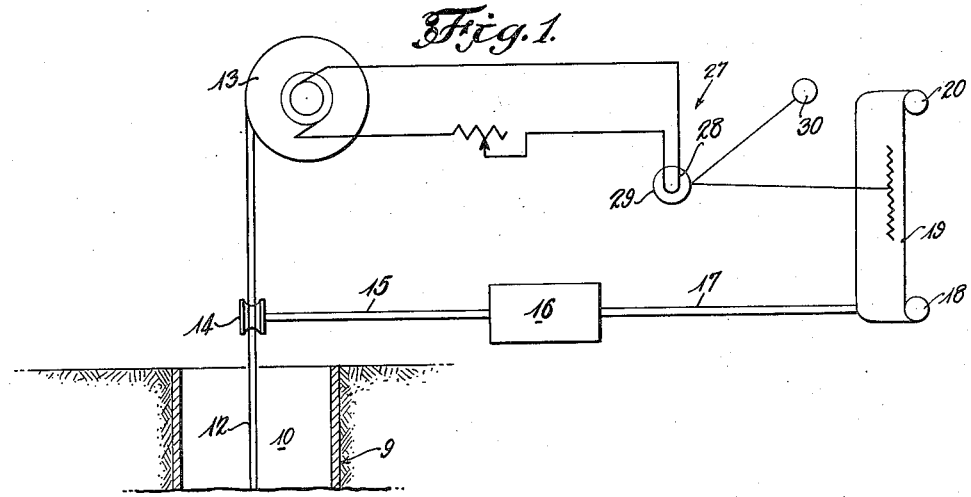
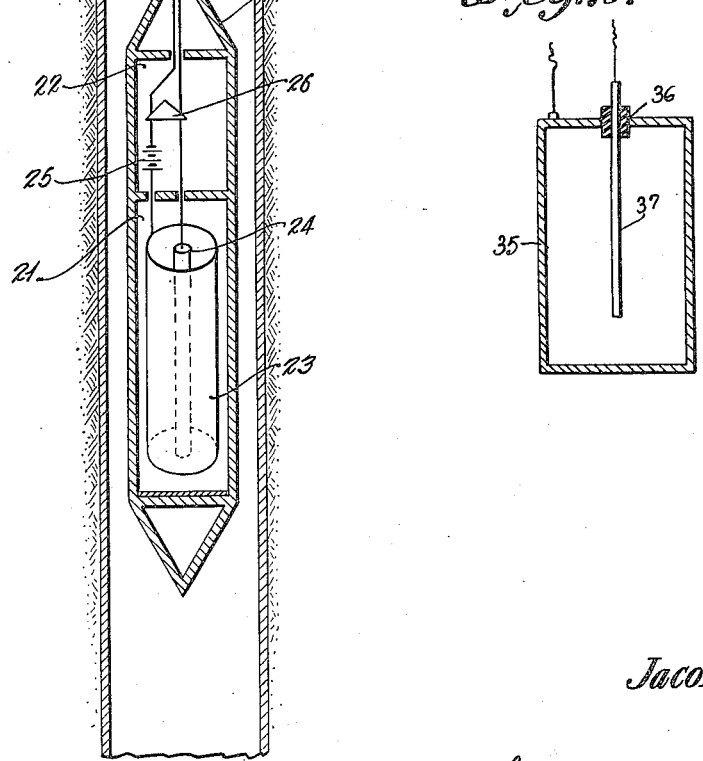
Inventor
Jacob Neufeld
By Stevens & Davis
Attorney Patented Mar. 10, 1942

2,275,456

UNITED STATES PATENT OFFICE 2,275,456

METHOD AND APPARATUS FOR RADIOACTIVE INVESTIGATION OF DRILL HOLES

Jacob Neufeld, Tulsa, Okla., assignor to Well Surveys, Incorporated, Tulsa, Okla., a corporation of Delaware Application June 7, 1939, Serial No. 277,964

9 Claims. (Cl. 250—83.6)

This invention relates to the art of geophysical prospecting and more specifically to the art of "well-logging," that is the art of determining what materials lie adjacent to the walls of a hole that has been drilled or dug into the earth.

In the industry of extracting oil and other materials from the earth's crust one of the major problems is that of determining what lies below the surface of the earth. Every method that can be used in a practical way to give any data whatever as to the sub-surface strata finds a ready use in this field. In new areas where wells have not been drilled, methods such as surface geology, seismic prospecting, gravity meter determinations, various forms of electrical surface prospecting and gas or soil analyses, all play important parts. In areas where wells have been drilled these methods are supplemented by geological studies of samples of the sub-surface strata brought to the surface in the drilling operation, electrical conductivity, resistivity, or inductive capacity determinations made in drill holes, soil and gas analyses of products taken from the drill holes and, according to a copending application of this same inventor, Serial No. 161,350, filed August 27, 1937, and entitled "Method and apparatus for radio-active investigation of drill holes," by the determination of the natural radioactivity of the sub-surface strata traversed by the drill hole. The present application is a continuation-in-part of this copending application.

According to this prior application much valuable information can be obtained about the sub-surface strata which the dril hole penetrates if a detector of radiations is lowered into the drill hole and a record made of the radiations which it detects at various depths therein. Various materials have definitely different degrees of radioactivity and in some places oil itself is directly locatable by its own radioactivity. Furthermore, it has been found that the radiations penetrate the steel casing of a cased drill hole sufficiently to give satisfactory results even in such a drill hole. This is particularly important where a hole has been drilled completely through an oil or gas pocket and the pocket sealed off without being discovered, by the drilling mud. This often happens and it is then desirable to find the oil or gas accurately and perforate the casing at that point to obtain it.

In this earlier application the detector of radiations which was specifically described was of the type commonly known as a Geiger-Muller counter. This device consists essentially of two electrodes maintained in a very rarefied gas. The potential on the electrodes is such that ionization of the gas will take place when radiations pass through it and strike molecules thereof and for that reason every time radiations do pass through the gas and strike molecules thereof, an instantaneous discharge takes place between the electrodes. These instantaneous discharges are what is recorded as an indication of the amount of radiation entering the drill hole from the adjacent strata.

Such a device serves well for making measurements at isolated points in a drill hole but is not adapted to make a continuous record indicating the quantity of radiations at every point along the drill hole. To make such a record from data obtainable by a Geiger-Muller counter it would be necessary either to make numerous stops and to take entirely separate readings at points extremely close together along the drill hole or to have the detector travel very, very slowly. Either way would be a tedious and very difficult process.

Furthermore, the above method of well surveying is not adapted to give sharp indications of the exact points at which the formations change. In order to make accurate location of transitions from one formation to another it would be necessary to make observations at very small intervals of depth. It would be highly impractical to make such closely spaced observations along the whole depth of a well and hence it would be necessary to make one series of observations, calculate the results and then make a second series of closely spaced observations at each transition point.

According to the present invention this difficulty has been overcome and a method and apparatus devised which will accurately measure the radioactivity of the structure adjacent a drill hole, rapidly and continuously so that the device can be continuously lowered or raised and the measurements taken efficiently during the movement.

The present invention obviates the inconveniences inherent to the use of a counter and provides a method for producing a continuous record in form of a graph indicating the variation in the intensity of the received radiations with respect to the depth at which the radiations are received. This is accomplished by the use of an ionization chamber, which contains a relatively dense material such as a gas under high pressure and which as a consequence permits a continuous flow of current governed as to its magnitude by the strength of the radiations which impinge upon the ionization chamber. This current is then utilized to form a continuous record which indicates the depth at which the instrument is operating and the strength of the radiations being received in the form of a graph. Thus, the graph indicates a continuous survey of the well and shows sharp breaks where changes in structure occur in the surrounding formations.

A more detailed understanding of this invention may be gained by a study of the following description of its preferred embodiment as illustrated diagrammatically in the accompanying drawing wherein:

Fig. 1 is essentially a diagrammatic illustration of the presently preferred embodiment of this invention and Fig. 2 is essentially a vertical sectional view of a high pressure ionization chamber forming a part of the apparatus.

Referring now particularly to the Fig. 1 of the drawing, a drill hole 9 is shown penetrating the formation to be explored. The drill hole may be provided with a tubular metalic casing such as designated by 10. The presence of the metallic casing in the drill hole is not an essential feature of the invention. The casing is merely shown for the purpose of illustrating the conditions under which the method may be practiced and it is understood that the process herein described may be applied in uncased as well as in cased holes.

The exploratory apparatus proper consists of a housing 11 which is lowered into the bore hole by means of a cable 12, containing insulated conductors. The cable has a length somewhat in excess of the length of the hole to be explored and is normally wound on a drum 13 positioned adjacent to the top of the drill hole. The cable may be unwound from the drum 13 to lower the exploring apparatus into the hole and may be rewound upon the drum to raise the exploring apparatus. Between the drum 13 and the hole there is a measuring reel 14 which is adjusted to roll on the cable in such a manner that the number of revolutions of the reel corresponds to the amount of cable which has passed up or down in the drill hole. The reel is mounted on a shaft 15, and the motion of the shaft is transmitted through a gear box 16 to another shaft 17 which turns a spool 18 to wind a photographic film 19, the film being supplied from a feed spool 20.

The housing 11 contains two compartments respectively designated by numerals 21 and 22. The compartment 21 contains an ionization chamber, having a cylindrical outer electrode 23 and a central wire electrode 24. The ionization chamber is filled with inert gas such as nitrogen preferably under pressure of about 300 pounds per square inch. Instead of nitrogen, propane under pressure or carbon disulphide or any other suitable material may be used. Also, the pressure may be varied from around 100 to around 500 pounds per square inch. The compartment 22 contains a battery 25 to apply a voltage to the ionization chamber and an amplifier 26 to amplify the current passing through the ionization chamber. The battery 25 has one of its terminals connected to the cylindrical electrode 23 and the other terminal connected to the input terminal of the amplifier. The central electrode 24 is directly connected to the other input terminal of the amplifier.

The output terminals of the D. C. amplifier 26 are connected to the cable 12 which conveys the current from the amplifier to a recording galvanometer 27 located at the surface of the earth. The recording galvanometer includes a moving coil 28 connected to the cable and a mirror 29 attached to the moving coil. The mirror is adapted to reflect a beam of light from a lamp 30 onto the sensitive film 19 to produce (after the film has been developed) a record in form of a well log.

A high pressure ionization chamber embodying the principles of this invention is diagrammatically illustrated in vertical sectional view in Fig. 2 of the accompanying drawing. It will be noted that the chamber comprises an outer shell or casing 35 formed of metal that serves as one of the electrodes. The casing is substantially cylindrical in shape and is provided with an opening in the top thereof wherein an insulative plug 36 is provided to receive and hold a rod-like electrode 37 which extends axially within the casing 35 substantially as shown. The interior of the casing 35 is filled with an inert gas, such as nitrogen, propane, carbon disulphide or similar material under a pressure from around 100 to around 500 pounds per square inch and it will be understood that the insulative plug 36 is fitted to the casing 35 and to the electrode 37 in a manner such as to preclude gas leakage under conditions of use.

The operation of my invention may be described as follows:

Radioactive material in the rock formations adjacent to the drill hole and outside the casing 10, produces radiations which consist of all three kinds, alpha particles, beta particles and gamma rays. Only the gamma rays, however, are penetrating enough to pass through the casing 10 and be detected in the space inside the casing. On the average there may be one quantum per second of nuclear gamma radiations penetrate the casing 10 from every thirty cubic centimeters of rock immediately adjacent thereto. A large fraction of the gamma rays which penetrate the casing 10 pass through the walls of the housing 11, and some of these are absorbed in the compressed gas situated between 23 and 24, enabling it to become electrically conducting. Because of the potential applied by battery 25, and the conductivity induced by the radiation, a current is enabled to pass the magnitude of which is directly proportional to the intensity of said radiation.

The above property of a high pressure ionization chamber to produce current proportional to the intensity of radiation constitutes one of essential characteristics of this method. Whereas the Geiger-Muller counter produces a discontinuous current, and results are obtained by counting the number of the current pulses, according to the present method a continuous current is produced and its magnitude recorded. This is accomplished by means of a high pressure ionization chamber in which the gas is made so dense by pressure, that it absorbs over a thousand times as much gamma radiation per unit volume as is absorbed by the gas in a Geiger-Muller counter. Consequently the ionization chamber produces a continuous current that varies in proportion to the radiations to which the gas is exposed.

In the method involving a Geiger-Muller counter in view of the fact that the gas is rarefied the chances of any particular radiation striking a molecule are very low and hence an extremely small proportion of the radiations are detected.

For this reason the device must be maintained in one position for a relatively long time to get an accurate result. In contrast to such a device, the ionization chamber of this application contains a large number of molecules, the collision between radiations and molecules are very frequent and thus a continuous current is permitted to pass, the magnitude of which is an accurate measure of the strength of the radiations.

It is therefore apparent that the present method enables a much more rapid determination of the strength of radiation. However, the essential merit of this method consists in its adaptability for producing a continuous log in place of isolated and individual measurements.

By means of the amplifier 26 the current produced in the ionization chamber is amplified and the output transmitted over the cable 12 to the galvanometer coil 28 by means of the mirror 29 attached thereto and the light source 30, a beam of light is produced the deflection of which is proportional to the intensity of the gamma radiations and in the neighborhood of the housing 11 at whatever place it is situated in the drill hole.

By means of the winch 13 the housing 11 and the instruments contained therein may be continuously raised or lowered in the hole. The measuring wheel 14 rolls on the cable 12 and through a gear box 16 connected to the rollers 18 and 20 through the shaft 17 moves the paper 19 an amount proportional to the movement of the housing 11 and the instruments therein in the drill hole. By means of the connections just described the light beam originating in 30 is enabled to trace a curve of gamma ray intensity versus depth on the paper 19 for the gamma rays which enter the casing. A further step in the operation consists in using the same method as the above but exchanging the housing 11 for another housing having different filtering characteristics. Several such substitutions may be made. Comparison of the intensity on the various curves as recorded at a particular depth allow an estimate of the spectral distribution of the gamma rays which entered the drill hole at that depth. Study of the general character of the graph of intensity versus depth enables the operator to quickly locate stratigraphic horizons which differ in any way from the formations adjacent to them.

It is to be understood that measurements may also be taken by moving the exploring apparatus from the bottom of the hole up to the surface while making recordings instead of or in addition to making recordings while lowering the exploring apparatus. The records produced in the manner described are preferably made on film which is calibrated longitudinally in accordance with the distance traversed by the exploring housing in the well hole.

Various modifications may be made of apparatus shown in the drawing. Thus instead of coordinating the movement of the film with that of the cable by the mechanical linkage shown in the drawing, the cable and the film may be caused to move in synchronism with each other by any known synchronizing mechanism such as the well known Selsyn motors.

I claim:

1. A method of measuring radiation that comprises subjecting a compressed gaseous medium, in the presence of radiation, to a constant electrical potential sufficient to cause a continuous current flow proportional to the intensity of said radiation, continuously measuring said current flow without appreciably altering the potential on the gaseous medium, and continuously recording the measurement.

2. Method of geophysical prospecting that comprises exposing a compressed gaseous medium, within a geological formation, to radiation emanating from said formation; subjecting the medium to a constant electrical potential sufficient to cause a continuous current flow proportional to the intensity of said radiation; continuously measuring said current flow without appreciably altering the potential on the gaseous medium; and continuously recording the measurement.

3. Method of geophysical prospecting that comprises exposing a compressed gaseous medium within a geological formation, to radiation emanating from said formation; subjecting the medium to a constant electrical potential sufficient to cause a continuous current flow proportional to the intensity of said radiation; continuously measuring said current flow without appreciably altering the potential on the gaseous medium; and continuously recording the measurement in correlation with indications of the place of measurement.

4. Method of geophysical prospecting that comprises positioning an envelope containing a compressed gaseous medium within a well bore whereby the medium is exposed to radiation emanating from surrounding geological formations, subjecting the medium to a constant electrical potential sufficient to cause a continuous current flow through said medium proportional to the intensity of said radiation; continuously measuring said current flow without appreciably altering the potential on the gaseous medium; and continuously recording the measurement in correlation with indications of the depth within the well bore at which the measurement was made.

5. A method of measuring radiation that comprises subjecting a gaseous medium at a pressure of the order of one hundred to five hundred pounds per square inch, in the presence of radiation, to a constant electrical potential sufficient to cause a continuous current flow proportional to the intensity of said radiation, continuously measuring said current flow without appreciably altering the potential on the gaseous medium, and continuously recording the measurement.

6. A method of measuring radiation that comprises subjecting nitrogen at a pressure of the order of one hundred to five hundred pounds per square inch, in the presence of radiation, to a constant electrical potential sufficient to cause a continuous current flow proportional to the intensity of said radiation, continuously measuring said current flow without appreciably altering the potential on the nitrogen and continuously recording the measurement.

7. Apparatus for measuring radiation that comprises a radiation-transparent envelope, a compressed gaseous medium within said envelope, means for subjecting said medium to a constant electrical potential sufficient to cause a continuous current flow proportional to the intensity of radiation in the vicinity of said envelope, means for continuously measuring said current flow without appreciably altering the potential on the gaseous medium, and means for continuously recording the measurement.

8. Apparatus for geophysical prospecting that comprises a metallic envelope substantially transparent to short-wave length radiation emanating from geological formations, compressed nitrogen within said envelope, means for subjecting the compressed nitrogen to a constant electrical potential sufficient to cause a continuous current flow proportional to the intensity of said radiation in the vicinity of said envelope, means for continuously measuring said current flow without appreciably altering the potential on the compressed nitrogen, and means for continuously recording the measurement.

9. Apparatus for geophysical prospecting that comprises a metallic envelope substantially transparent to short-wave length radiation emanating from geological formations nitrogen at a pressure of the order of one hundred to five hundred pounds per square inch within said envelope, means for subjecting the compressed nitrogen to a constant electrical potential sufficient to cause a continuous current flow proportional to the intensity of said radiation in the vicinity of said envelope, means for continuously measuring said current flow without appreciably altering the potential on the compressed nitrogen, and means for continuously recording the measurement in correlation with indications of the place at which the measurement was made.

JACOB NEUFELD.